United States Patent
Mukai et al.

[19]

[11] Patent Number: 5,812,281
[45] Date of Patent: Sep. 22, 1998

[54] FACSIMILE WITH MULTIPLE-PROTOCOL CAPABILITY AND METHOD THEREFOR

[75] Inventors: Hirokazu Mukai; Minoru Nagata, both of Tokyo, Japan

[73] Assignee: NEC Corporation, Tokyo, Japan

[21] Appl. No.: 763,091

[22] Filed: Dec. 10, 1996

[30] Foreign Application Priority Data

Dec. 11, 1995 [JP] Japan .................................. 7-346076

[51] Int. Cl.[6] ...................................................... H04N 1/32
[52] U.S. Cl. .......................... 358/435; 358/436; 358/442
[58] Field of Search .................... 358/434–436, 358/438–440, 442, 412, 425; 379/93.31–93.34; 375/222; H04N 1/32

[56] References Cited

U.S. PATENT DOCUMENTS

| | | | |
|---|---|---|---|
| 5,349,634 | 9/1994 | Shimomura | 358/438 |
| 5,381,240 | 1/1995 | Murayama | 358/436 |
| 5,406,388 | 4/1995 | Matsuzaki | 358/434 |
| 5,585,938 | 12/1996 | Imamura | 358/436 |
| 5,661,568 | 8/1997 | Ueno | 358/436 |

*Primary Examiner*—Kim Yen Vu
*Attorney, Agent, or Firm*—McGinn & Gibb, P.C.

[57] ABSTRACT

A communication apparatus, such as a facsimile machine, for transmitting and receiving data to and from a device, includes a transmitter for receiving a first signal from the device and transmitting, in response to the first signal, a second signal for a predetermined time period. The transmitter receives a third signal from the device in response to the second signal, and transmits a fourth signal when the third signal is not received within the predetermined time period and transmits a fifth signal when the third signal is received within the predetermined time period. The transmitter receives a sixth signal from the device in response to the fourth signal. A detector, connected to the transmitter, detects which of the third signal and the sixth signal is received from the device. A controller, connected to the transmitter and the detector, controls a protocol of transmission and receipt of the data.

26 Claims, 8 Drawing Sheets

FACSIMILE WITH MULTIPLE-PROTOCOL CAPABILITY AND METHOD THEREFOR

BACKGROUND OF THE INVENTION

1. Field of the Invention

The present invention generally relates to a facsimile machine and method therefor, and more particularly to a facsimile machine having a modem conforming to the International Telecommunications Union (ITU)-T Recommendation V.34, and a method in which depending on a signal received by a called station, the called station will operate under a plurality of protocols, even though it has begun operating under a different protocol.

2. Description of the Related Art

Generally, facsimile technology combines copying with transmission. Specifically, an electric signal representing the image of a subject copy is generated by a scanner and is transmitted to a recorder. The recorder, either nearby or distant, marks a recording medium according to the received signal, thereby generating a facsimile copy (also referred to as a "record copy"). The received record copy is a facsimile (e.g., image replica) of the original subject copy.

ITU-T Recommendation V.34 (published September, 1994) which defines data communication procedure, and T.30 (published June, 1992) which defines some facsimile procedure, will be revised in the near future. According to the revised ITU-T Recommendation V.34 and T.30, a facsimile will be equipped with a modem conforming to ITU-T Recommendation V.34 for high-speed data communication. Thus, it is necessary to develop such a facsimile. The revised Recommendation V.34 will define rules for initiating communication in a sequence starting according to ITU-T Recommendation V.8 (first protocol) and thereafter changing to Recommendation V.34 (second protocol). Thus, the facsimile conforming to ITU-T Recommendation V.34 and T.30, will perform the communications as discussed below.

A calling station (i.e., a remote or nearby facsimile machine placing the call) initiates a call to a called station (i.e., the facsimile machine to which the call is placed). In response to the call, the called station transmits to the calling station a response tone signal (e.g., an "ANSam" signal defined in ITU-T Recommendation V.8), and the calling station detects the ANSam signal and, in return, transmits a calling menu signal (e.g., a "CM" signal) defined in ITU-T V.8 back to the called station. Upon detection of the CM signal, the called station, in return, transmits a joint menu signal (a "JM" signal) to the calling station.

Thereafter, the procedure in ITU-T Recommendation V.8 transitions to a procedure in ITU-T Recommendation V.34, whereby the operation for transmitting and receiving the facsimile message is performed.

Figure 8:
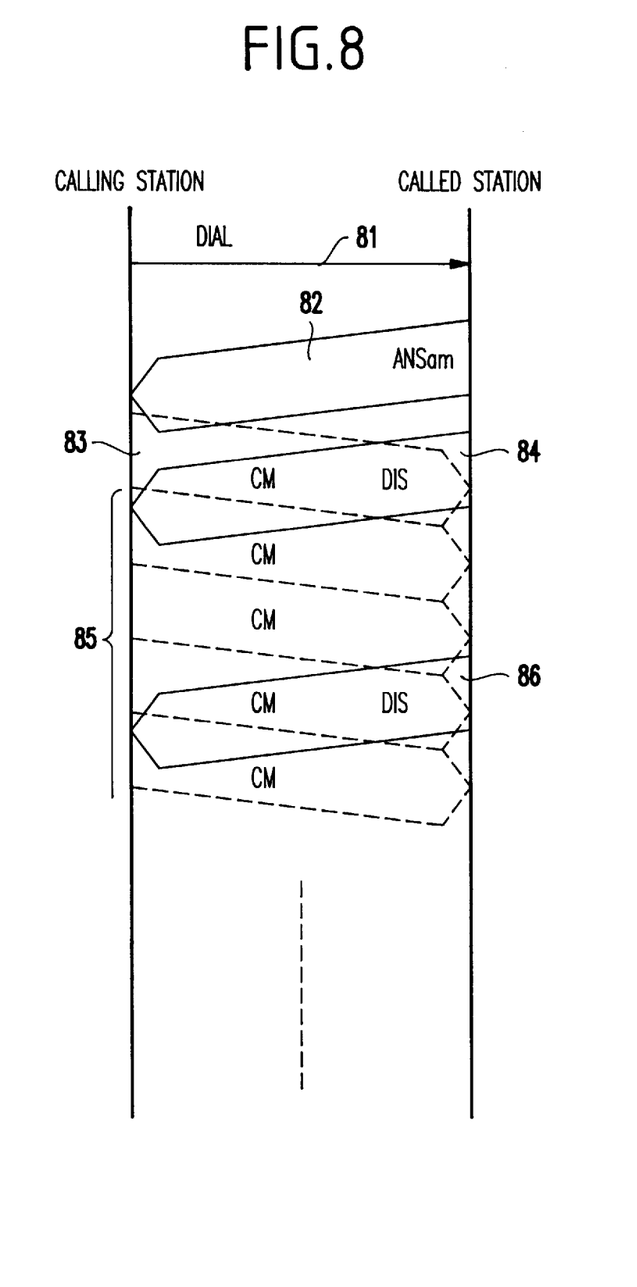
FIG. 8 is a timing chart explaining a facsimile communication of a facsimile expected under revised ITU-T Recommendation V.34 and T.30.

FIG. 8 is a chart showing how communications will be established between facsimile machines conforming to the revised ITU-T Recommendations V.34 and T.30. In FIG. 8, in step 81 the calling station dials the called station. In response thereto, the called station returns the ANSam signal to the calling station in step 82 (e.g., shown by solid-line arrow 82). The calling station detects the ANSam signal from the called station and, in return, transmits the CM signal in step 83 (shown by the dashed-line arrow 83).

In the example shown in FIG. 8, the called station stops transmitting the ANSam signal at the approximate time when the calling station starts transmission of the CM signal, which prevents the called station from properly receiving the CM signal. The foregoing exchange of signals is typically referred to as the "first protocol".

If the CM signal is received by the called station properly, then the called station generally transmits the JM signal to the calling station, and the data transmission occurs according to the procedure defined in ITU-T Recommendation V.34. This exchange is referred to as the "second protocol".

However, instead of transmitting the CM signal, the calling station may wait for the called station to transmit a digital identification signal (a "DIS" signal as shown by solid-line arrow 84). The DIS signal indicates that the called station has a receiving function which allows transmissions to occur according to the binary procedure in ITU-T Recommendation T.30.

In response to the DIS signal, the calling station transmits a digital command signal (a "DCS" signal; not illustrated) which is a command signal indicating that it can operate within the set of standards associated with ITU-T Recommendation T.30. This is referred to as the "third protocol".

However, facsimile machines experience communication problems when the situation illustrated in FIG. 8 occurs.

Specifically, because of time delays associated with the line connection, the signal detection, the signal line delay, or other similar delays, the transmission of the CM signal from the calling station is delayed. This delay may cause the called station to stop transmitting the ANSam signal and to begin transmitting the DIS signal before the called station receives the CM signal. For example, in FIG. 8 the CM signal 83 does not reach the called station until the called station has already terminated the ANSam signal (solid-line arrow 82) and has started transmitting the DIS signal (solid-line arrow 84).

The called station will only be able to receive and recognize the CM signal while it is transmitting the ANSam signal because, once the called station stops transmitting the ANSam signal and begins transmitting the DIS signal, the called station only looks for the digital command signal (DCS).

In such a situation, the calling station will continue to transmit the CM signal (illustrated in FIG. 8 by the multiple dash-line arrows) and will look only for the JM signal to be transmitted by the called station. Similarly, the called station will continue to transmit the DIS signal and look only for the DCS signal. Since neither the calling station nor the called stations will receive the response they are seeking, normal communication cannot be initiated and the call will eventually be terminated without effective data transmission. This is a problem.

SUMMARY OF THE INVENTION

In view of the foregoing problems of the facsimile systems, it is an object of the present invention to provide a facsimile and method for establishing normal communication even when a calling station responds to a called station with a signal different from the one which the called station expects.

To attain the above described and other objects, features and advantages of the invention, in a first aspect, a facsimile for transmitting and receiving data to and from a device is provided according to the present invention, that includes a transmitter for receiving a call from the device and for transmitting, in response to the call, a response tone signal for a predetermined time period, the transmitter for receiving a calling menu signal from the device in response to the response tone signal, and for transmitting a digital identification signal when the calling menu signal is not received within the predetermined time period and for transmitting a joint menu signal when the calling menu signal is received within the predetermined time period. Further, the transmitter is for receiving a digital command signal from the device in response to the digital identification signal. A receiving signal detector, connected to the transmitter, detects whether the calling menu signal or the digital command signal is received from the device. A controller, connected to the transmitter and the receiving signal detector, controls a protocol of the transmitting and receiving of the data.

In a second aspect of the invention, a method is provided for establishing a communication protocol between a first device and a second device. The method includes steps of: receiving, by the first device, a first signal from the second device; transmitting a second signal from the first device to the second device for a predetermined time period; judging, by the first device, whether a third signal has been received from the second device; transmitting a fourth signal from the first device to said second device when the third signal is judged to have been received by the first device from the second device within the predetermined time period; transmitting a fifth signal from the first device to the second device when the third signal is judged to have not been received by the first device from the second device within the predetermined time period; after transmitting the fifth signal, simultaneously receiving the third signal and a sixth signal from the second device to the first device; and determining a communication protocol based on which one of the third signal and the sixth signal is received by the first device.

In the invention, the response tone signal determined by a first protocol preferably comprises an ANSam signal, CM and JM signals shown in ITU-T Recommendation V.8, a second protocol comprises ITU-T Recommendation V.34, and a third protocol comprises a binary procedure in ITU-T Recommendation T.30.

In the present invention, when the response signal is transmitted by the called station for a predetermined time period, and the calling menu signal is not received from the calling station within the predetermined time period, the called station transmits the digital identification signal and is for selectively receiving both the calling menu signal and the digital command signal.

Depending on the signal received by the called station, the called station will operate under either the first or third protocol. Therefore, the inventive apparatus and method can proceed according to the first protocol even after it has begun operating according to the third protocol.

Thus, the invention is a method and facsimile machine that can simultaneously look for a first protocol signal and a third protocol signal. Conventional facsimiles look first for a calling facsimile to transmit a first protocol signal (CM) and, if the firdt protocol signal is not found, the conventional facsimile looks only for the calling facsimile to transmit a third protocol signal (DCS).

The invention overcomes the problem that occurs when the first protocol signal is delayed and the conventional facsimile cannot receive the first protocol signal that is being transmitted by the calling facsimile because the conventional facsimile is only looking for the third protocol signal.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
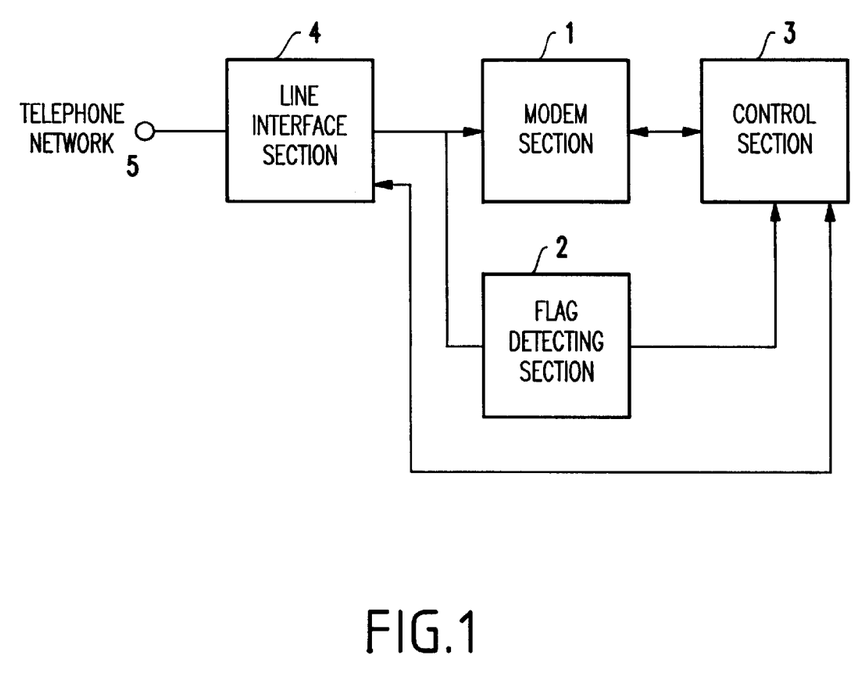
FIG. 1 is a block diagram showing a preferred embodiment of the present invention.

Referring now to the drawings, and more particularly to FIG. 1, a block diagram showing a preferred embodiment of a facsimile machine according to the present invention is illustrated.

Generally, the facsimile machine according to the invention is provided in accordance with the standards and definitions set forth in the International Telegraph and Telephone Consultative Committee (CCITT) and found in Fascicle VII.3 of the Eighth Plenary CCITT (1984).

Further, the preferred embodiment of the invention operates at least within the called facsimile. The calling facsimile may be a conventional facsimile. Of course, both the called and calling facsimile machines may incorporate the structure of the preferred embodiment of the present invention.

As shown in FIG. 1, the facsimile includes a modem section 1 having known modulating/demodulating functions required for facsimile communication and a framing/deframing function according to a high-level data link control (HDLC) procedure. The modem section 1 conforms to ITU-T Recommendation T.30, V.34 and V.8, and initiates communications in a sequence described below.

A flag detecting section 2 of the called station detects a flag pattern of an HDLC frame modulated by a high frequency channel V.21 (H) according to ITU-T Recommendation V.21, and a control section 3, that includes a microprocessor, controls the transmission and receiving of data and is coupled to received inputs from the modem section and the flag detecting section. Thus, the control section 3 of the called station monitors the states of the modem section 1 of the called station and the flag detecting section 2 of the called station.

A line interface section 4 of the called station for connection to a telephone line network terminal 5 provides an output to the flag detecting section 2 of the called station and to the modem section 1 of the called station.

Turning to FIGS. 2–5, the above sections of the inventive structure will be described in detail below.

Figure 2:
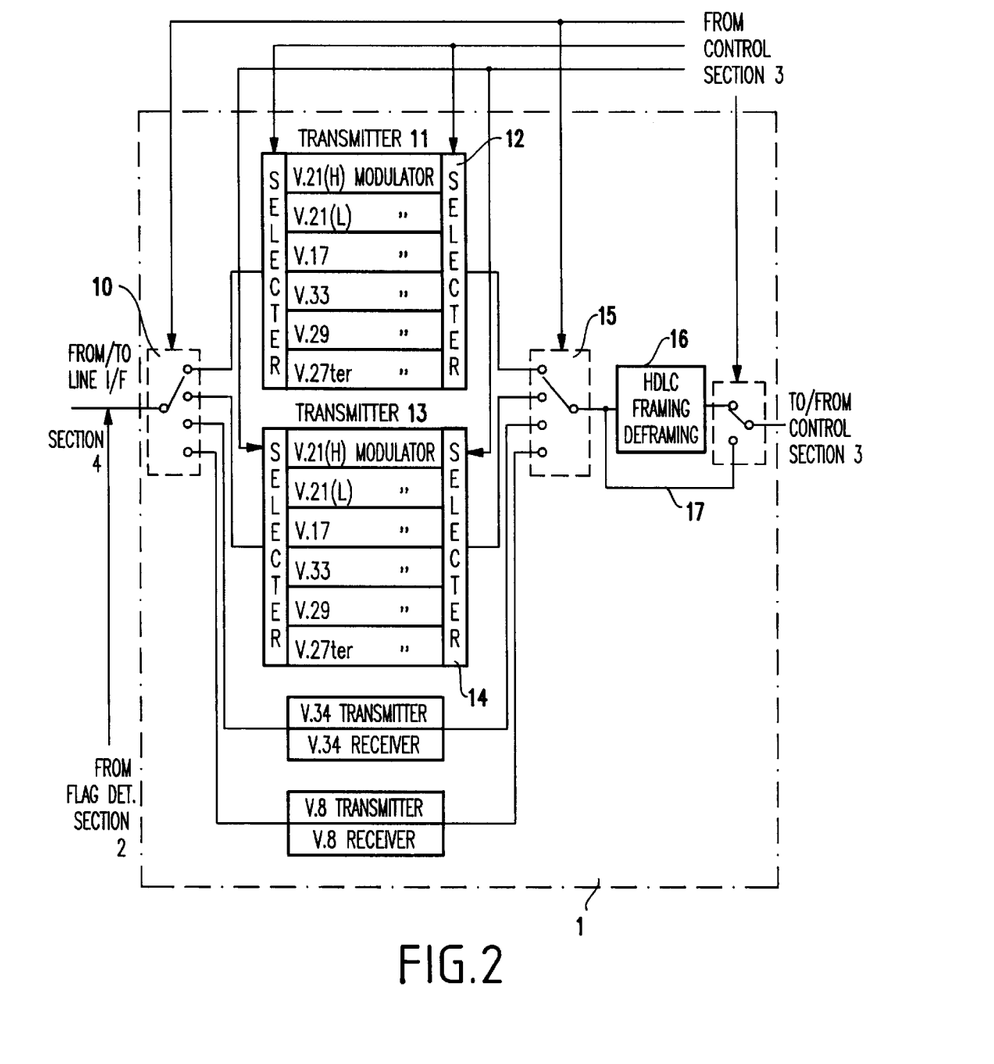
FIG. 2 illustrates the modem section 1 of the structure of the preferred embodiment of the present invention.

As shown in FIG. 2, the modem section 1 has a switching circuit 10 for selecting one of the transmitter and the receiver, and receives inputs/outputs from the liner interface section 4 and inputs from the flag detecting section 2. The transmitter 11 has V.21(H), V21.(L), V.17, V.33, V.29 and V.27ter modulators, and selectors 12 for selecting one of the modulators. The receiver 13 has a V.21(H), V.21.(L), V.17, V.33, V.29 and V.27ter demodulators, and selectors 14 for selecting one of the demodulators. V.17, V.33, V.29 and V.27ter modulators and demodulators are selected when the facsimile image data are transmitted under ITU-T Recommendation T.30. It is noted that the "H" and "L" conventions used above represent relatively "high" and "low" values, respectively.

Representative baud (symbol) rates and data rates are given below in Table 1 for each of the Recommendations:

TABLE 1

| Recommen-dation | Baud Rate (Symbol Rate) | Data Rate |
|---|---|---|
| V.21(H) | 300 | 300 bps |
| V.21(L) | 300 | 300 bps |
| V.8 | 300 | 300 bps |
| V.33 | 2400 | 14.4/12K bps |
| V.17 | 2400 | 14.4/12/9.6/7.2K bps |
| V.29 | 2400 | 9.6/7.2K bps |
| V.27ter | 1600(4.8K bps) 1200(2.4K bps) | 4.8/2.4K bps |
| V.34 | 3429/3200/3000/2800/2743/2400 | 28.8/26.9/24/21.6/ 19.2/16.8/14.4/12/ 9.6/7.2/4.8/2.4K bps |

An HDLC framing and deframing circuit 16 in the modem 1 is connected to the transmitter 11 and receiver 13 via a switching circuit 15. It receives framing signals from the control section 3 to form the HDLC signal and supplies the HDLC signal to V.21(H), V.21 (L), or V.34 modulators of the transmitter 11, and deframes the HDLC signal from V.21(H), V.21(L), or V.34 demodulators of the receiver 13 and supplies signals to the control section 3. When the HDLC framing/deframing is unnecessary (for example when V.8 or picture data transmission is operated), the HDLC framing and deframing circuit 16 is not selected and a direct operation to/from the control section 3 from/to the transmitter/receiver is employed by use of the line 17 bypassing the HDLC framing/deframing circuit 16. For the modem section, HDLC binary framing is typically performed for the DIS (NSF, CSI), DCS and CFR signals. Such an operation depends on the type of facsimile machine being employed. Typically, no HDLC framing is required/performed for the TCF, CM, JM and CJ signals.

Generally, in the receiving mode, the HDLC circuit 16 is switched to receive the HDLC signal and performs a deframing operation and detected signal to be applied to the control section 3. In the transmitting mode, signals from the control section 3 are framed and sent to the transmitter 11. Non-HDLC signals are sent directly as mentioned above.

A key feature of the structure of the facsimile system according to the present invention is the addition of the V.34 transmitter and V.34 receiver, as well as the V.8 transmitter and V.8 receiver, coupled between the switching circuits 10 and 15, in combination with the other types of transmitters and receivers including the modulators as shown. Such a combination and usage of V.34 and V.8 transmitters/receivers has not been employed in facsimile machines hitherto the invention.

Figure 3:
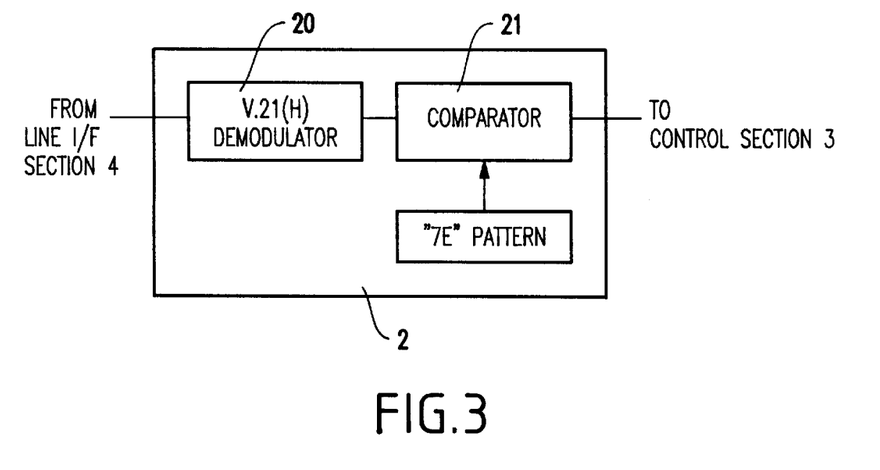
FIG. 3 illustrates the flag detecting section 2 of the structure of the preferred embodiment of the present invention.

Referring to FIG. 3, the flag detecting section 2 is shown in greater detail. The flag detecting section 2 has a V.21 (H) demodulator 20 for demodulating the received signal ruled (defined) by V.21(H). A comparator 21 compares the demodulated signal code with the code "7E" 23 (a predetermined flag pattern) of the DCS flag which is input to the comparator 21. When the comparator 21 detects coincidence, the comparator 21 issues a coincidence signal (e.g., the DCS signal) to the control section 3 to inform the control section that the DCS flag has been detected.

As discussed in further detail below, when the flag detecting section 2 of the called station detects the flag pattern of the DCS signal, the control section 3 of the called station sets the modem section 1 of the called station to receive an HDLC frame according to ITU-T Recommendation V.21 (H) in a framing/deframing procedure. Thereafter, the modem section 1 of the called station receives from the control section 3 of the called station a binary procedure signal according to ITU-T Recommendation T.30 so that it can receive signals such as a training check signal (a "TCF" signal) transmitted from the calling station and so that the called station can transmit signals such as a confirmation-to-receive signal (a "CFR" signal) in response thereto. Thereafter, the calling and called facsimile machines communicate with one another according to the procedure outlined in ITU-T Recommendation T.30.

Figure 4:
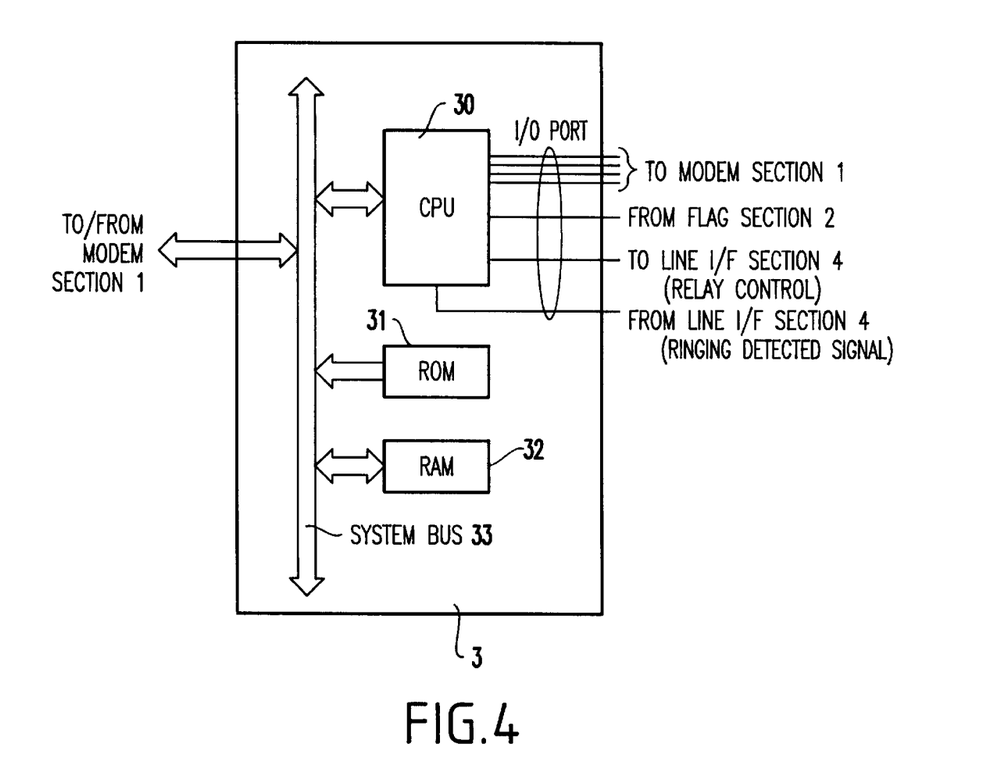
FIG. 4 illustrates the line interface section 4 of the structure of the preferred embodiment of the present invention.

Referring to FIG. 4, the control section 3 includes a central processing unit (CPU) 30, a read-only memory (ROM) 31 and a random access memory (RAM) 32, each connected by a system bus 33. The CPU 30 controls the switching and selecting of the modem section 1 and a line switch 41 of the line interface section 4 (described in further detail below) in accordance with the detected ringing signals from the line interface section 4, the resultant signals (e.g., the flag detection signals) from the flag detector 2 and the signals from the modem section 1. The CPU 30 outputs a relay control signal to the line interface section 4.

Figure 5:
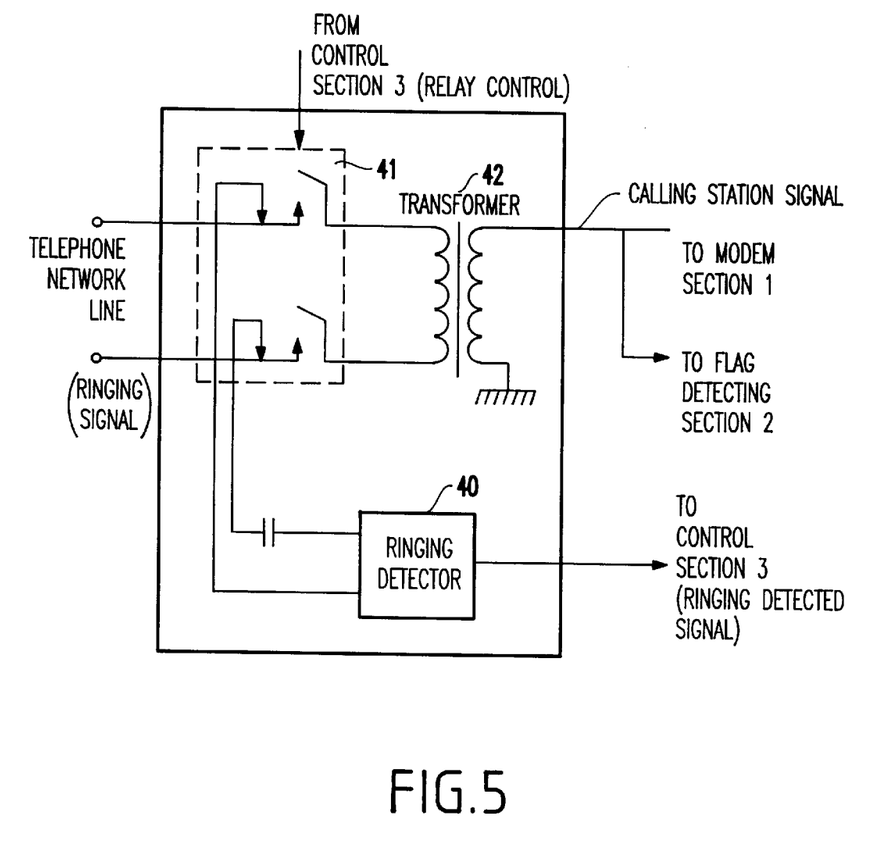
FIG. 5 illustrates the control section 3 of the structure of the preferred embodiment of the present invention.

Referring to FIG. 5, the line interface section 4 includes a ringing detector 40, line switch 41 and a transformer 42. When the ringing signal is detected by the ringing detector 40, the ringing detected signal is supplied to the control section 3, and then the line switch 41 is closed to connect the line to the transformer 42 under the control of the control section 3.

Figure 6A:
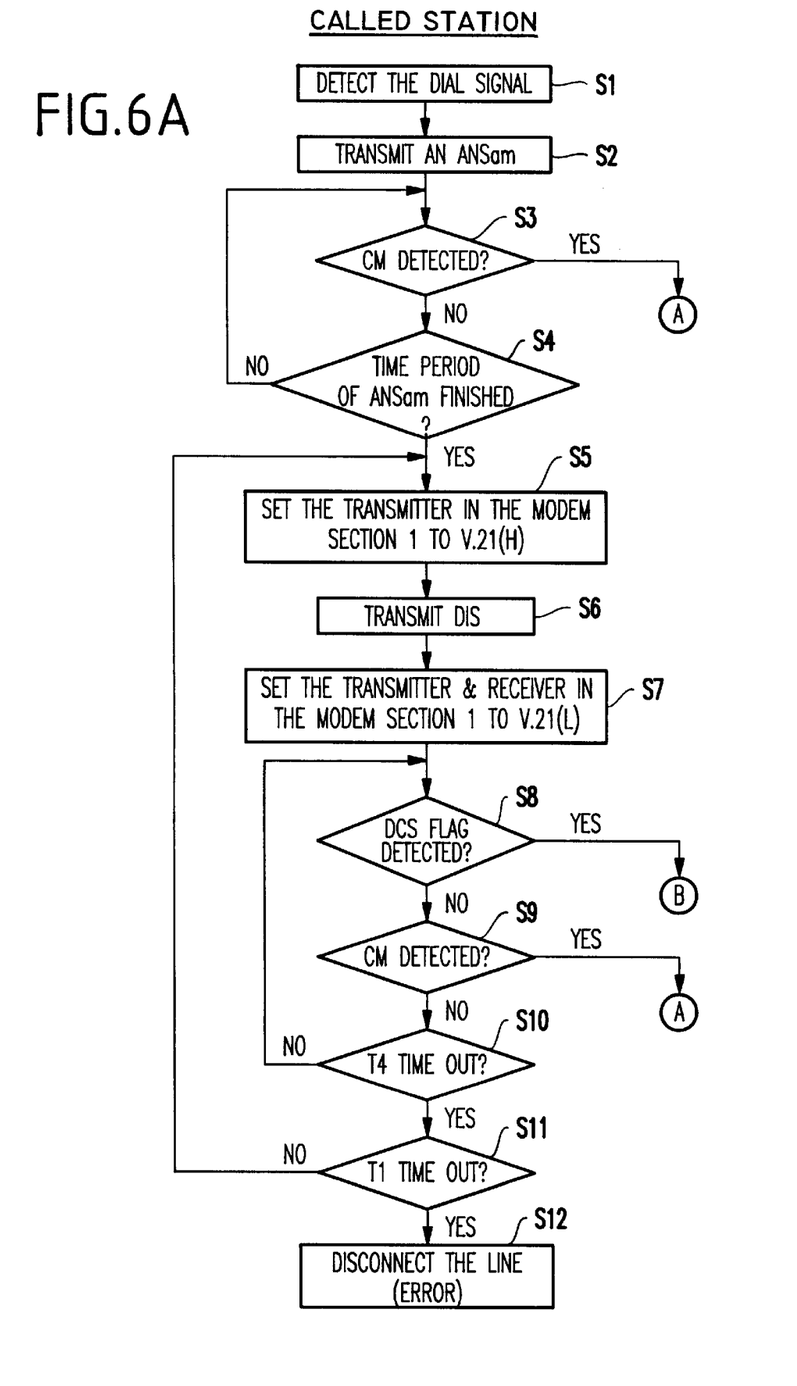
FIGS. 6A–6C illustrate a flowchart of the operation of the structure according to the present invention.
Figure 6B:
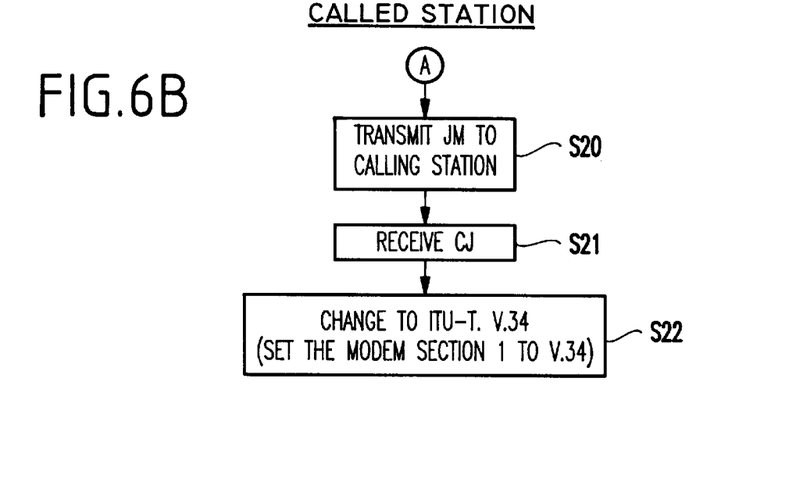
Figure 6C:
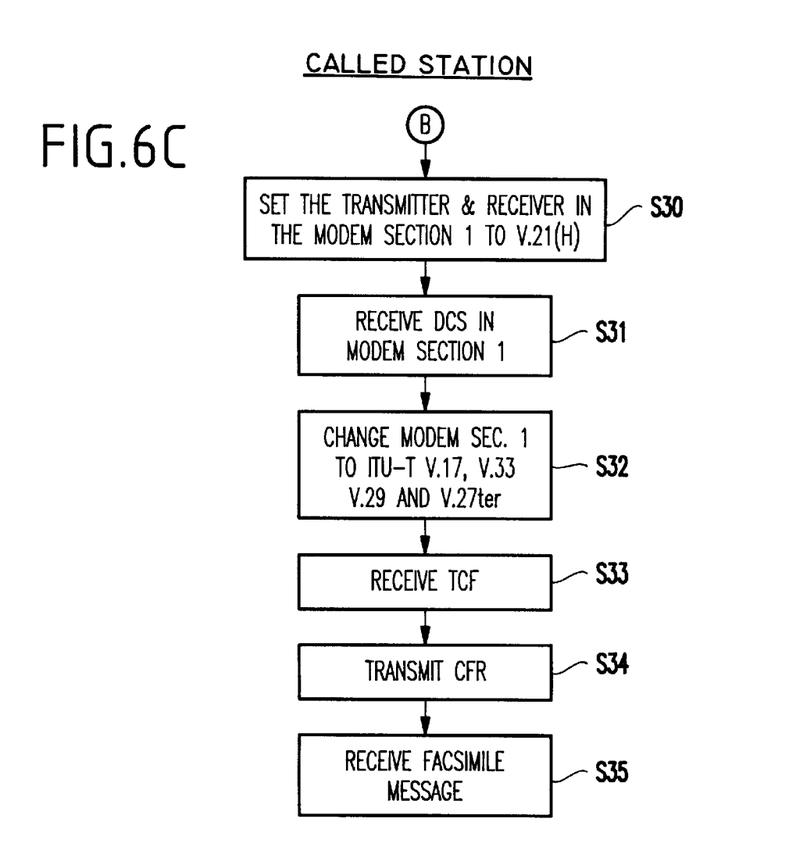

Turning now to FIGS. 6A–6C, which illustrate flowcharts of the operation of the structure according to the present invention, and to FIG. 7 which illustrates a timing diagram of the invention, the inventive operation and structure will be described hereinbelow. As mentioned above, it is assumed that the invention is implemented in at least the called station.

First, in step S1 (and shown in line 71 of FIG. 7), a called station is called by a dial signal from a calling station, and the dial signal is detected by the called station.

Upon detection of the dial signal, the switch 41 of the line interface section 4 is closed, and in step S2, as a result of the called station detecting receipt of the dial signal, the called station issues a response tone signal (e.g., an ANSam signal as shown by solid-line arrow 72) defined in ITU-T Recommendation V.8. The ANSam signal is transmitted back to the calling station through the line interface section 4 of the called station from the modem section 1 of the called station under the control of the control section 3 of the called station.

In response to the ANSam signal issued by the called station, the calling station returns a calling menu (CM) signal (as represented by the dashed-line arrow 72 in FIG. 7) to the called station.

In step S3, it is determined whether a calling menu (CM) signal is detected. According to Recommendation V.8, the CM signal is detected by V.21(L) modulatror. If the CM signal is detected by V.21(L)(e.g., a "YES"), then the process continues to step S20 of FIG. 6B described in further detail below. If the CM signal is not detected (e.g., a "NO"), then the process continues to step S4. In step S4, it is determined whether the time period of the ANSAM signal has elapsed. Typically, the time period is set between 2.6 and 4.0 seconds. This time can be measured by use of a timer (not illustrated) in the CPU 30 of the control section 3 or the like. If the time period has not yet elapsed (e.g., a "NO"), the process loops back to Step S3 to again determine whether the CM signal has been detected. It is noted that steps S2 through S4 (as well as steps S20 and S21 described below) constitute the V.8 Recommendation.

If the time has elapsed in step S4 (e.g., a "YES"), then in step S5, the transmitter 11 in the modem section 1 is set in accordance with V.21(H).

Thereafter, in step S6 a digital identification signal ("DIS"; as represented by the solid-line arrow 13) is transmitted via the modem section 1 of the called station, which modulates the DIS, and the line interface section of the called station 4.

In step S7 the transmitter and receiver in the modem section 1 are set in accordance with V.21(L). This step is for detecting the CM signal.

Figure 7:
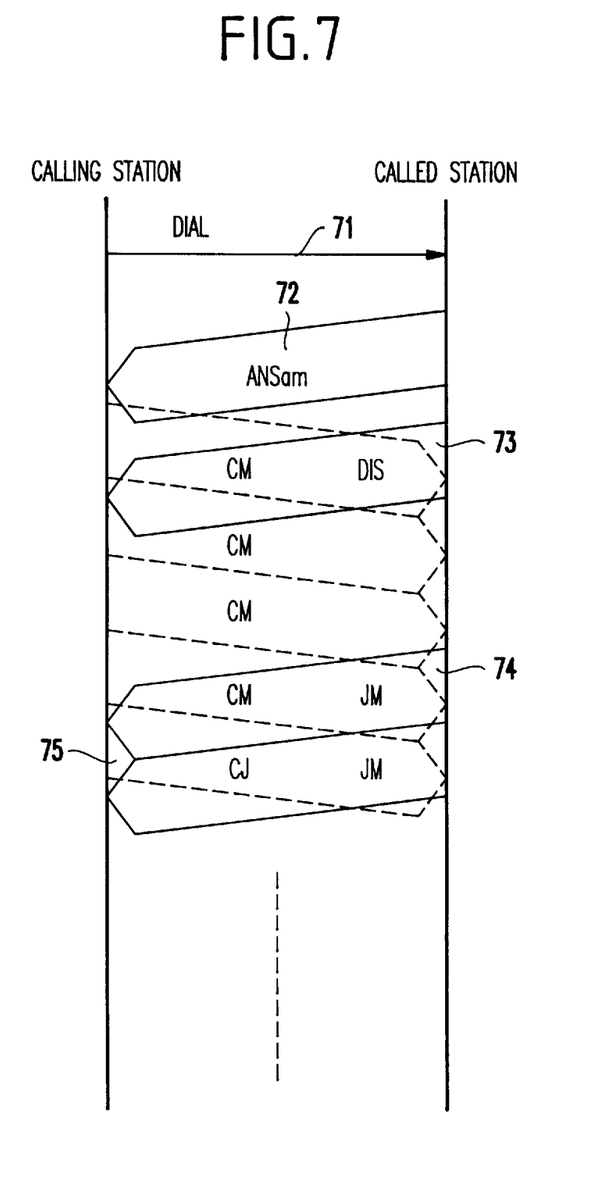
FIG. 7 is a timing chart for explaining the operation of the preferred embodiment of the present invention shown in FIG. 1.

It is noted that, in the example shown in FIG. 7, the called station does not receive the calling menu signal (e.g., the CM signal) within the predetermined time period (i.e., preferably within a range of 2.6 to 4 seconds) while the ANSam is transmitted. While preferred ranges of the time period have been set forth above, the predetermined time period could be any time period according to the designer's requirements and constraints.

In the example of FIG. 7, since the called station transmitted the ANSam signal for the predetermined time period but did not receive the CM signal while the called station was transmitting the ANSam signal, the called station assumes that the calling station will operate according to the third protocol (ITU-T Recommendation T.30).

Thus, in step S6 of FIG. 6B, the called station transmits the digital identification signal ("DIS"; as represented by the solid-line arrow 73) via the modem section 1 of the called station, which modulates the DIS, and the line interface section of the called station 4.

The DIS signal is defined in ITU-T Recommendation T.30 and preferably is a non-standard facilities ("NSF") signal for identifying a request from a particular user outside the range of the T-series Recommendations and is an optional signal. A "called subscriber identification ("CSI") signal" for displaying the called station by an international telephone number may be added to the DIS signal.

Thereafter, the called station looks for a digital command signal ("DCS") signal in response to the DIS signal issued thereby. Specifically, in step S8, it is determined whether the DCS signal is received from the calling station.

If the DCS flag has been detected by the flag detecting section 2 (e.g., a "YES"), then the process continues to step S30 shown in FIG. 6C and described in further detail below. If the DCS flag has not been detected (e.g., a "NO"), the process continues to step S9 to determine whether the calling menu (CM) signal has been detected by the modem section 1.

If the CM has been detected by the modem section 1 (e.g., a "YES"), then the process continues to step S20 shown in FIG. 6B and described in further detail below. It is noted that steps S8 and S9 are performed in parallel (simultaneously).

If the CM has not been detected (e.g., a "NO"), then in step S10 it is determined whether the time under T4 has expired. The T4 time period represents the time that the called station waits for the DCS flag, and, for example, is either 3 or 4.5 seconds. The 3-second time period is for facsimile machines set to an "automatic receive" mode, whereas the 4.5-second time limit is set for the "manual receive" mode, both time periods depending upon the hardware and the machine employed. It is noted that these time periods are in the alternative. Hence, if the automatic mode is set the 3-second time period is followed and if the manual mode is set then the 4.5-second time period is followed. Similarly to the time period mentioned above in step S4, the time period T4 is counted (e.g., measured) in the CPU 30 of the control section 3. Thus, T4 represents the time which the called station waits for the DCS flag signal and it depends on the hardware involved.

In step S10, if it is determined that the T4 time has elapsed, then the process continue to step 11 at which it is determined whether a time period T1 has elapsed. The time period T1 is a time period equal to approximately 35 seconds (+/−5 seconds) and represents the time period of continuous DIS transmission in step S6.

If the determination in step S11 is "NO", then the process proceeds to Step S5 again to reset the transmitter in the modem section 1 in accordance with V.21(H) and so forth. If the determination is "YES", then in step S12, the line is disconnected and it is determined that an error has occurred. It is noted that the time periods T1 and T4 are set in accordance with CCITT T.30, and further that steps S5 through S12 are performed in accordance with CCITT T.30. Thus, the time period T1 represents the time of the continuous DIS transmission in step S6.

Turning to FIG. 6B, the process is shown after the called station detects the CM signal in step S3 or when the CM signal is detected in step S9.

In step S20 of FIG. 6B, after the CM signal has been detected, a joint menu (JM) signal is transmitted to the calling station. Thereafter, in step S21, the called stations receives a "CJ" signal which is a signal for terminating the CM signal (e.g., a CM signal terminator). In step S22, the called station changes to ITU-T. V.34 (e.g., the modem section 1 is set in accordance with V.34).

FIG. 6C illustrates the process performed in the called station after the flag detecting section 2 in the called station has detected the DCS flag in step S8 in FIG. 6A. Specifically, in step S30 the called station sets the transmitter and receiver in the modem section 1 in accordance with V.21 (H).

Thereafter, in step S31, the DCS signal is received into the modem 1, and in step S32 the modem section 1 is changed to ITU-T V.17, V.33, V.29 and V.27ter and are performed by the modem section 1. It is noted that there is 1 second (+/−.15 seconds) between flag detection and the receipt of the DCS in the modem section 1. This delay occurs because the modem cannot receive when it is in a "low" state. Thus, approximately one second is required to set the modem section 1 accordingly in step S30.

In step S33, a "training check facilities" (TCF) signal is received form the calling station, and in step S34 a confirmation-to-receive (CFR) signal is transmitted by the called station. Finally, in step S35, the facsimile message from the calling station is received by the called station. As mentioned above, T30 overlaps V.8 and V.34 somewhat, and includes steps S5 through S12 in FIG. 6A.

In the example shown in FIG. 7, the calling station only transmits a CM signal and does not transmit a DCS signal. Therefore, the called station terminates transmission of the DIS signal. According to the invention, since no DCS signal was received, the control section 3 of the called station sets the receiver and the transmitter of the modem section 1 of the called station to a low-frequency channel modulation system (according to ITU-T Recommendation V.21). This setting allows the modem section 1 of the called station to receive the CM signal and to transmit the joint menu signal (the JM signal as represented by solid-line arrow 74) in response thereto. Additionally, it is noted that, in the example shown in FIG. 2, the CM signal is repeatedly transmitted by the calling station.

The control section 3 of the called station is notified that the modem section 1 of the called station has received the CM signal and directs the modem section 1 of the called station to start transmitting the JM signal.

In response to the JM signal, in step 75 of FIG. 7, the calling station transmits the ("CJ") signal (e.g., as represented by the dashed-line arrow 75 and representing the CM termination signal), after which the modem switches from the high-frequency procedure defined in ITU-T Recommendation V.8 to the procedure defined in ITU-T Recommendation V.34 and the transmission and receipt of data between the transmitting and receiving facsimile machines begins.

Therefore, by utilizing both a modem section 1 and a flag detecting section 2, the facsimile according to the present invention can simultaneously look for both the CM signal and the DCS signal. The modem section 1 of the called station looks for the CM signal while the flag detecting section 2 of the called station looks for the flag associated with the flag pattern of the DCS system.

As described above, according to the present invention, when a called station transmits a response tone signal (ANSam), but a calling menu signal (CM) is not received from a calling station within a predetermined time period, the called station transmits a digital identification signal (DIS) and the called station looks for (e.g., is available to receive) both the calling menu signal (CM) and a digital command signal (DCS). This allows the called station to proceed according to either a first or third protocol depending on which signal is received, even when the response tone signal is stopped before the calling menu signal from the calling station is received.

Therefore, the apparatus according to the present invention can transmit and receive the facsimile message and return to a procedure conforming to the first protocol and then can transfer to the second protocol, even after the facsimile has begun operating according to the third protocol.

The above invention is not limited to facsimile machines but can be applied to any device which establishes analog or digital communications via modem or other similar apparatus. Further, in the example of facsimile machines, any type of facsimile machines may be used for the calling station. Thus, communications can be achieved with the called station incorporating the invention and any type of calling station.

While the invention has been described with reference to a single preferred embodiment described above, it is not limited thereto and includes all variations which would be known to those ordinarily skilled in the art.

Having thus described our invention, what we claim as new and desire to secure by Letters Patent is as follows:

1. A facsimile for transmitting and receiving data to and from a device, said facsimile comprising:

a transmitter for receiving a first signal from said device and transmitting, in response to said first signal, a second signal for a predetermined time period, said transmitter for receiving a third signal from said device in response to said second signal, and for transmitting a fourth signal when said third signal is not received within said predetermined time period and transmitting a fifth signal when said third signal is received within said predetermined time period, said transmitter for receiving a sixth signal from said device in response to said fourth signal;

a detector, connected to said transmitter, for detecting which of said third signal and said sixth signal is received from said device; and a controller, connected to said transmitter and said detector, for controlling a protocol of transmission of said data.

2. A facsimile according to claim 1, wherein said first signal comprises an initial calling signal, said second signal comprises a response tone signal, said third signal comprises a calling menu signal, said fourth signal comprises a digital identification signal, said fifth signal comprises a joint menu signal, and said sixth signal comprises a digital command signal.

3. The facsimile according to claim 2, wherein said response tone signal comprises an ANSam signal of a first protocol and said calling menu signal comprises a CM signal of said first protocol, and
wherein said protocol comprises one of a second protocol corresponding to International Telecommunications Union Recommendation ("ITU-T Recommendation") V.34 and a third protocol corresponding to a binary procedure in ITU-T Recommendation T.30.

4. A facsimile as in claim 2, wherein when said calling menu signal is not received within said predetermined time period, said transmitter is available to receive said calling menu signal and said digital command signal.

5. A facsimile as in claim 3, wherein said controller sets said transmitter to a third protocol to transmit said digital identification signal when said calling menu signal is not received within said predetermined time period, and resets said transmitter to a first protocol when said calling menu signal is received after said predetermined time period.

6. A facsimile as in claim 5, wherein said transmitter is set to a first frequency channel in said first protocol and said transmitter is set to a second frequency channel in said third protocol, wherein said second frequency is higher than said first frequency.

7. A facsimile comprising:

a modem section having a modulator and a demodulator;

a line interface section, for being connected to a communication network, and for providing an output to said modem section;

a flag detecting section for detecting a flag pattern of said output of said line interface section;

a control section, operatively connected to said modem section and said flag detecting section, for controlling a transmission and receiving of data by said modem section, and said facsimile receiving a first signal from a calling station, transmitting a second signal to said calling station for a predetermined time period in response to said first signal, said facsimile receiving a third signal from said calling station and transmitting a fourth signal to said calling station in response to said third signal, wherein, when said third signal is not received within said predetermined time period, said facsimile transmits a fifth signal to said calling station and said control section sets said modem section to receive said third signal from said calling station and sets said flag detecting section to receive said flag pattern from said calling station.

8. A facsimile according to claim 7, wherein said control section controls a protocol of said modem section depending on whether said modem section receives said third signal or said flag detecting section receives said flag pattern.

9. The facsimile according to claim 8, wherein said first signal comprises an initial calling signal, said second signal comprises a response tone signal, said third signal comprises a calling menu signal, said fourth signal comprises a joint menu signal, and said fifth signal comprises a digital identification signal, and wherein said response tone signal comprises an ANSam signal, and said protocol comprises one of a second protocol corresponding to International Telecommunication Unions Recommendation ("ITU-T Recommendation") V.34 and a third protocol corresponding to a binary procedure in ITU-T Recommendation T.30.

10. A facsimile as in claim 8, wherein after said third signal is not received within said predetermined time period, said control section simultaneously sets said modem section to receive said third signal and said flag detecting section to receive said flag pattern.

11. A facsimile as in claim 8, wherein said control section sets said modem section to a third protocol when said third signal is not received within said predetermined time period and resets said modem section to a first protocol when said third signal is received within said predetermined time period.

12. A facsimile as in claim 11, wherein said modem section is set to a first frequency channel in said first protocol and said modem section is set to a second frequency channel in said second protocol, wherein said first frequency is higher than said second frequency.

13. A method for establishing a communication protocol between a first device and a second device, said method comprising steps of:

receiving, by said first device, a first signal from said second device;

transmitting a second signal from said first device to said second device for a predetermined time period;

judging, by said first device, whether a third signal has been received from said second device;

transmitting a fourth signal from said first device to said second device when said third signal is judged not to have been received by said first device from said second device within said predetermined time period;

transmitting a fifth signal from said first device to said second device when said third signal is judged to have been received by said first device from said second device within said predetermined time period;

after transmitting said fourth signal, said first device waiting to receive one of said third signal and a sixth signal from said second device.

14. A method according to claim 13, further comprising a step of:

determining a communication protocol based on which one of said third signal and said sixth signal is received by said first device.

15. A method as in claim 13, wherein said first signal comprises an initial calling signal, said second signal comprises a response tone signal, said third signal comprises a calling menu signal, said fourth signal comprises a digital identification signal, said fifth signal comprises a joint menu signal, and said sixth signal comprises a digital command signal.

16. A method as in claim 13, wherein said protocol comprises one of a modulating/demodulating protocol and a framing/deframing protocol.

17. A method as in claim 16, wherein said first device and said second device each comprise a facsimile machine, and wherein said modulating/demodulating protocol comprises a communication protocol established by International Telecommunications Union Recommendation ("ITU-T Recommendation") V.34, and said framing/deframing protocol comprises a communication protocol established by ITU-T Recommendation T.30.

18. A method as in claim 13, wherein said step of transmitting the fourth signal is terminated when one of said third signal and said sixth signal is received by said first device.

19. A method as in claim 15, wherein said digital command signal is received by a step of recognizing a flag of said digital command signal.

20. A method as in claim 19, wherein said flag comprises a flag pattern of a high-level data link control protocol.

21. A communication apparatus, comprising:

a modem section having a modulator and a demodulator;

a line interface section, for being connected to a communication network, and for providing an output to said modem section;

a flag detecting section for detecting whether a flag pattern of said output of said line interface section has a predetermined pattern associated with a first communication protocol, thereby to output a flag pattern detection signal; and a control section, operatively connected to said modem section and said flag detecting section, for selecting one of said communication first protocol and a second communication protocol for transmission or reception of data by said modem, depending on whether a signal associated with said second communication protocol is received by said modem section from a calling station or said flag pattern detection signal is detected within a predetermined time period.

22. A communication apparatus according to claim 21, wherein said signal associated with said second communication protocol comprises a calling menu signal and is received by said modem section.

23. A communication apparatus as in claim 21, wherein said first communication protocol comprises ITU-T Recommendation T.30 and said second communication protocol comprises a protocol other than ITU-T Recommendation T.30.

24. A method of establishing a communication protocol between a first device and a second device, comprising steps of:

providing in said first device a modem section with a modulator and a demodulator, and a line interface section, which is for being connected to a communication network;

providing an output of said line interface section to said modem section;

detecting whether a flag pattern of said output of said line interface section has a predetermined pattern, thereby to output a flag pattern detection signal; and controlling a transmission and receiving of data by said modem section, depending on whether one of a predetermined signal is received by the modem section in said first device from said second device and said flag pattern detection signal is output within a predetermined time period, wherein said first device comprises a called station and said second device comprises a calling station, said called station receiving a first signal from said calling station, and transmitting a second signal to said calling station for a predetermined time period in response to said first signal, said called station for receiving a third signal from said calling station and for transmitting a fourth signal to said calling station in response to said third signal, said predetermined signal comprising said third signal, wherein, when said third signal is not received within said predetermined time period, said called station transmits a fifth signal to said calling station and said control section sets said modem section of said called station to receive said third signal from said calling station and said called station being set to receive said flag pattern from said calling station, and wherein said control section controls a protocol of said modem section depending on whether said modem section receives said third signal or said called station receives said flag pattern.

25. A method of establishing a communication protocol between a first device and a second device, comprising steps of:

providing in said first device a modem section with a modulator and a demodulator, and a line interface section, which is for being connected to a communication network;

providing an output of said line interface section to said modem section;

detecting by a detecting section whether a flag pattern of said output of said line interface section has a pattern associated with a first communication protocol, thereby to output a flag pattern detection signal; and selecting said first communication protocol or a second communication protocol for transmission and reception of data by said modem section, depending on whether a signal associated with said second communication protocol is received by the modem section in said first device from said second device or said flag pattern detection signal is detected within a predetermined time period.

26. A method as in claim 25, wherein said first communication protocol comprises ITU-T Recommendation T.30 and said second communication protocol comprises a protocol other than ITU-T Recommendation T.30.

* * * * *